PAPER JOGGER

Original Filed April 23, 1969 4 Sheets-Sheet 1

INVENTOR.
WALTER J. HANSON

BY Martin D. Wittstein
ATTORNEY

PAPER JOGGER

Original Filed April 23, 1969 4 Sheets-Sheet 2

INVENTOR.
WALTER J. HANSON

BY
Martin D. Wittstein
ATTORNEY

PAPER JOGGER

Original Filed April 23, 1969 4 Sheets-Sheet 3

INVENTOR.
WALTER J. HANSON

BY Martin D. Wittstein
ATTORNEY

PAPER JOGGER

Original Filed April 23, 1969 4 Sheets-Sheet 4

INVENTOR.
WALTER J. HANSON

BY Martin O. Wittstein
ATTORNEY

United States Patent Office

Re. 27,814
Reissued Nov. 20, 1973

27,814
PAPER JOGGER

Walter J. Hanson, Old Greenwich, Conn., assignor to Pitney-Bowes, Inc., Stamford, Conn.

Original No. 3,593,992, dated July 20, 1971, Ser. No. 818,536, Apr. 23, 1969. Application for reissue Nov. 8, 1972, Ser. No. 304,780
Int. Cl. B65h *31/38*
U.S. Cl. 271—89 10 Claims

Matter enclosed in heavy brackets [ ] appears in the original patent but forms no part of this reissue specification; matter printed in italics indicates the additions made by reissue.

ABSTRACT OF THE DISCLOSURE

A jogger for aligning stacked sheets of paper or the like comprising a tilted table and a pair of jogger arms pivotally mounted to the table. The jogger arms carry paddle portions which extend above the tabletop along two adjacent sides of the table. Followers on each arm are operatively engaged by a multilobed cam which causes the arms and associated paddles to pivot in synchronism and bring into alignment sheets stacked on the tabletop. A prop may be provided on the tabletop to facilitate the alignment of cross-stacked sheets.

BACKGROUND OF THE INVENTION

In the handling of stacks of paper sheets, as for example collated pages of a pamphlet, book or manuscript, it is most important that all the sheets be properly aligned with one another for operations such as cutting, stapling or binding. This can be done by hand by the familiar procedure of alternately tapping two adjacent edges of the stack against a flat surface. However, this procedure is obviously much too time consuming, expensive and unreliable for commercial operations. Accordingly, automated machinery known as joggers have been developed to perform this function.

Prior art joggers, however, have not been fully satisfactory. In some the paper stack is continually agitated on a vibrating table against some type of stop member. The continual agitation of the stack in such an apparatus may cause sheets to become misaligned almost as fast as they are aligned. In addition, continual agitation often results in the buildup [on] *of* an undesirable static charge on the sheets which causes them to stick together. In other prior art joggers the particular type or frequency of the agitating movement has not proven satisfactory.

Another problem typical of prior art joggers arises when using the technique of "cross-stacking." Cross-stacking involves varying the angular orientation of consecutive stacks as deposited on the jogger so that simultaneous jogging of plural stacks can be accomplished while maintaining the collated integrity of each. Where used on prior joggers, a pinching effect has often occurred between stacks which has prevented the proper alignment of sheets therein. Since cross-stacking provides an efficient and highly desirable way of maximizing the output of a jogging machine, its use is most important in commercial, high-volume applications.

Accordingly, representative objects of the present invention are to provide a paper jogger having an agitating motion which accurately and efficiently aligns misaligned sheets in a stack, which leaves aligned sheets essentially free from agitation, and which eliminates pinching between stacks where cross-stacking is used, and to provide such a jogger which is simple in construction, relatively inexpensive, and is reliable, efficient, and quiet in operation.

Other objects of the invention will in part be obvious and will in part appear hereinafter.

The invention accordingly comprises the features of construction, combination of elements and arrangement of parts which will be exemplified in the constructions hereinafter set forth, and the scope of the invention will be indicated in the claims.

SUMMARY OF THE INVENTION

The present invention relates to a jogger and more particularly to a paper jogger having a pair of jogging paddles which act on adjacent sides of a paper stack to align misaligned sheets thereof.

In a preferred [emobidment] *embodiment,* the invention comprises a stationary table upon which one, or where cross-stacking is employed, plural stacks of paper sheets can be supported. Preferably, the [anuglar] *angular* orientation of the table with respect to a horizontal plane can be adjusted for various types of paper or paper finishes to aid in overcoming frictional inertia.

A pair of jogger arms having upwardly extending paddle portions are pivotably mounted to the table, with the paddle portions extending above the level of the tabletop along two adjacent sides. The paddles are actuated by a driving means which causes the jogger arms to pivot in alternate directions in a synchronous manner with respect to the stationary table. The driving means preferably comprises a multilobed cam which actuates cam followers on the jogger arms to effect synchronous pivotal movement. The synchronous pivotal movement of the jogger arms causes pivotal movement of the paddles which tamp against adjacent edges of any misaligned sheets stacked on the table forcing each misaligned sheet to assume an aligned position in the stack.

When alignment is attained, the aligned sheets come essentially to rest in the stack which, as a whole, is spaced from and therefore substantially unagitated by the paddles. The present jogger thus overcomes the disadvantages of prior art machines wherein continuous table motion generates static electricity and may cause aligned sheets to again become misaligned. In addition, it has been found that the particular synchronous pivotal movement of the paddles of the invention provides a much more effective and reliable jogging action for aligning paper sheets.

In addition, the jogger of the invention is also preferably provided with a raised prop on the table for overcoming, in a manner more fully detailed hereinafter, the pinching effect previously common in cross-stacking operations. The prop also serves to increase the stiffness of the sheets, rendering them more responsive to the tamping action of the paddles.

BRIEF DESCRIPTION OF THE DRAWINGS

For a fuller understanding of the nature and objects of the invention, reference should be had to the following detailed description taken in connection with the accompanying drawings in which.

Figure 8:
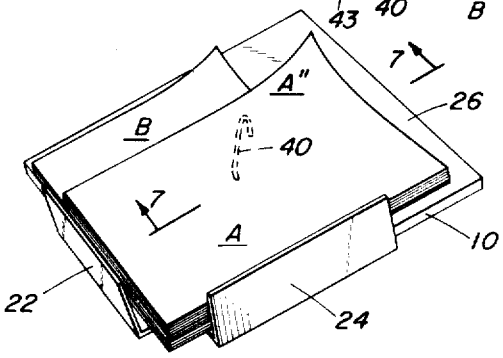

FIG. 8 is a front perspective view of cross-stacked sheets on the jogger of the invention showing the effect of the paper prop in eliminating pinching.

Similar reference characters refer to similar parts throughout the several views of the drawings.

DESCRIPTION OF THE PREFERRED EMBODIMENTS

Figure 1:
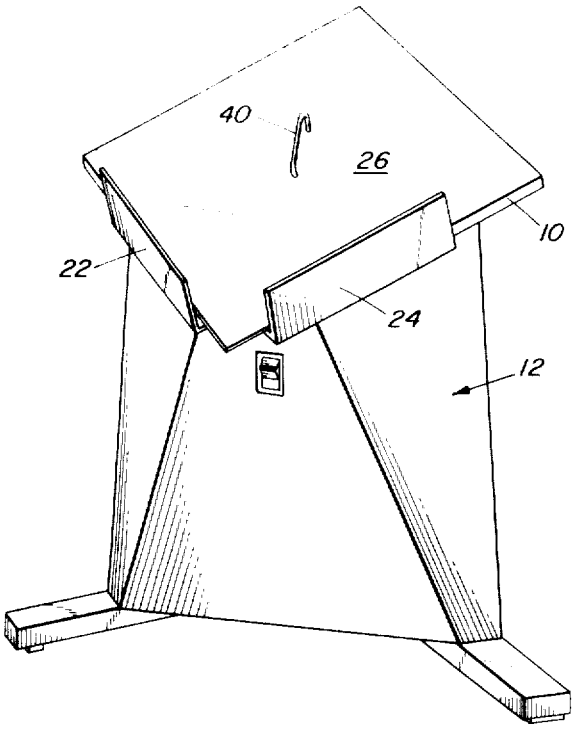
FIG. 1 is a front perspective view of the jogger of the invention.
Figure 6:
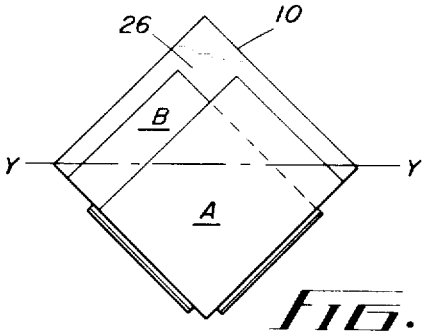
FIG. 6 is a top plan view of cross-stacked sheets on a jogger.

Referring now to FIG. 1, the jogger of the invention comprises a table 10 preferably mounted to a base 12 at an incline of substantial magnitude which is at least sufficient to provide a gravitational component to sheets being agitated to the table 10. As will be seen from the following discussion, the angled mounting of table 10 aids in the alignment of sheets stacked thereon by adding a gravitational component to the other forces urging the sheets into alignment. The tilt or inclination of the table 10 is preferably made adjustable by conventional means, not shown.

Figure 2:
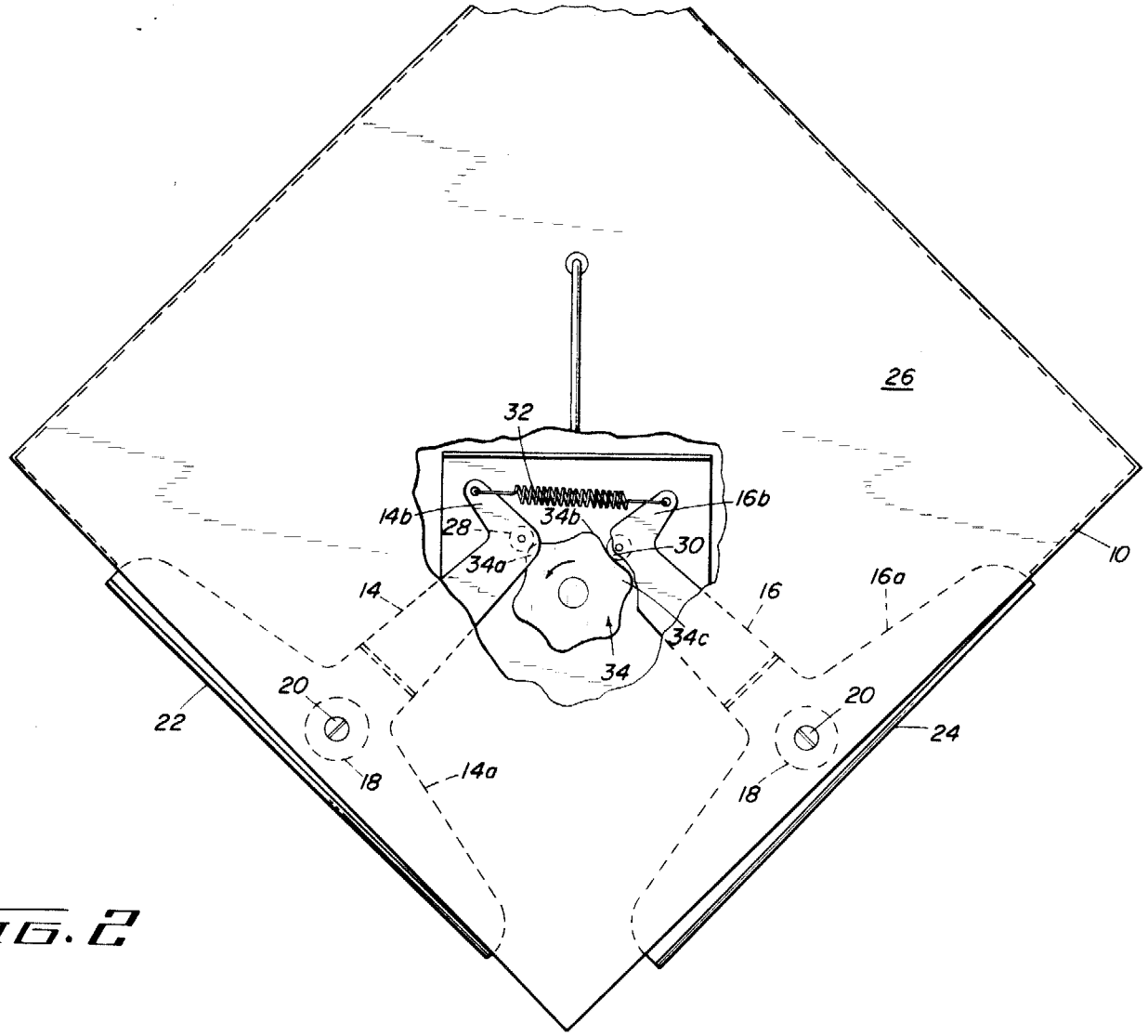
FIG. 2 is an enlarged top plan view of the jogger of FIG. 1 partly broken away to show the jogger mechanism, and showing the jogger paddles in their extreme counterclockwise position.
Figure 3:
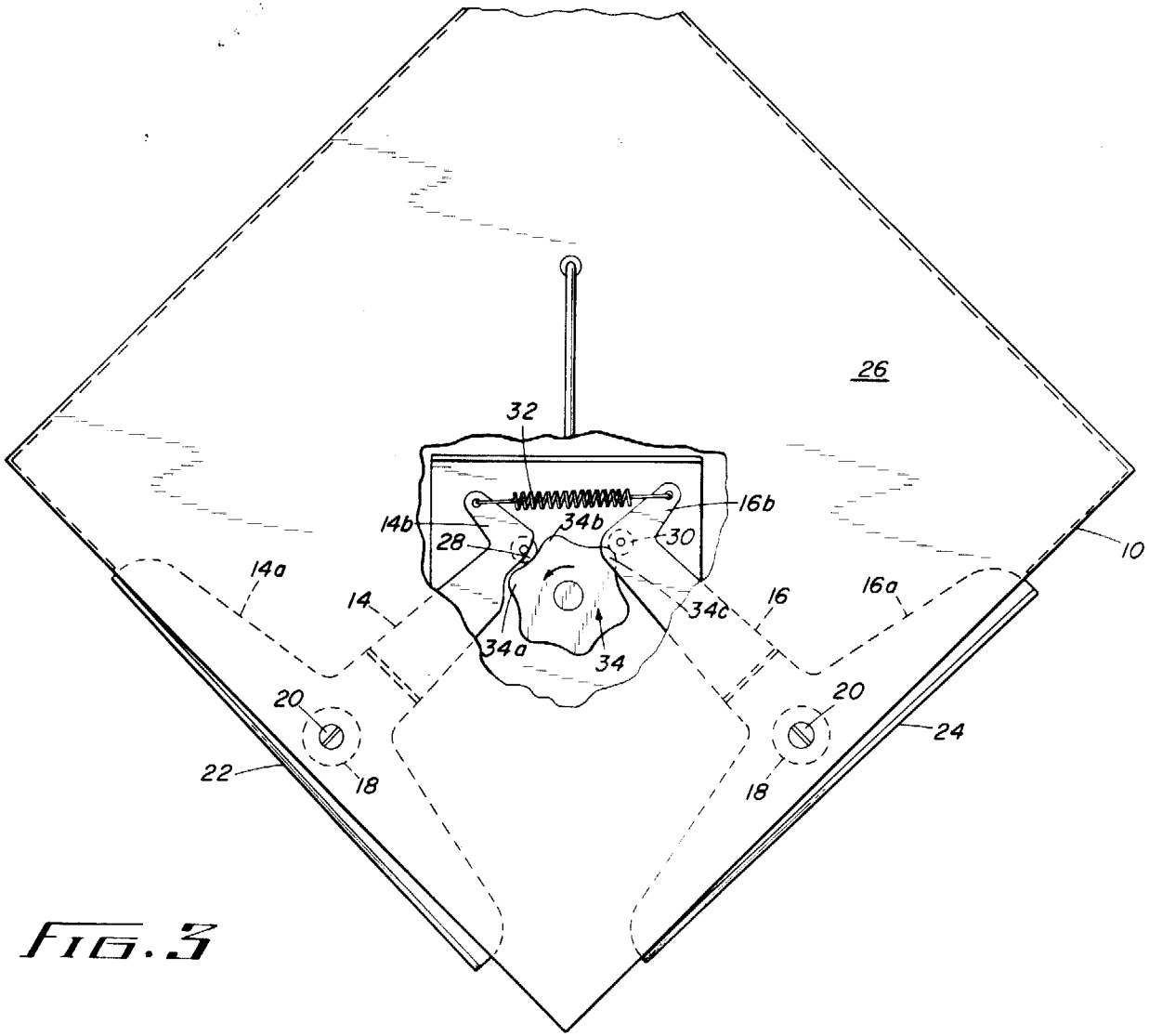
FIG. 3 is a view similar to FIG. 2 but showing the jogger paddles in their extreme clockwise position.
Figure 4:
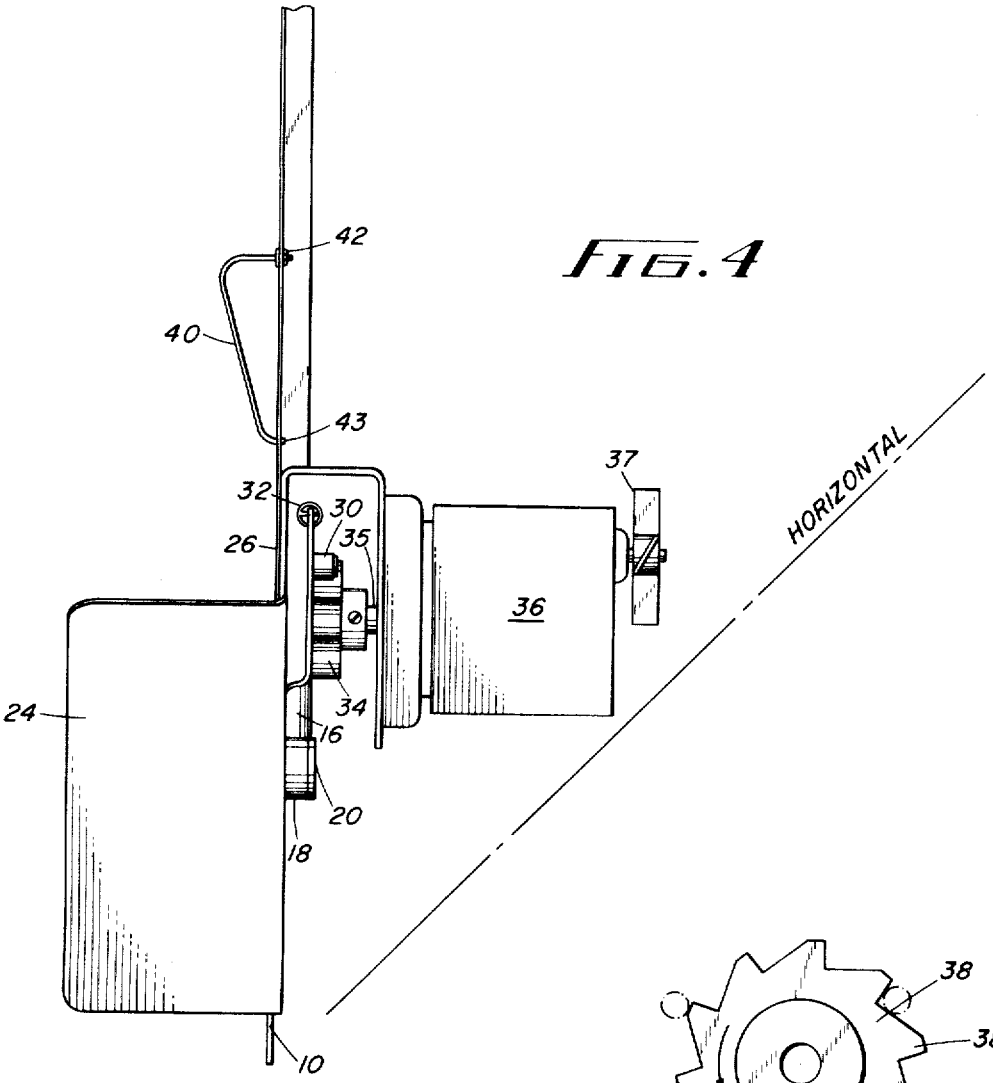
FIG. 4 is a side elevation view of the jogger mechanism.

As shown in FIGS. 2 to 4, a pair of jogger arms 14 and 16 (FIGS. 2 and 3) are each pivotally mounted to the underside of table 10 by means of a hub 18 (FIG. 4) which is fastened to the arm and mounted on a pivot 20 fastened to the table. Each jogger arm 14, 16 is flared out at one end 14a, 16a, and is bent upwardly at substantially a right angle to form jogger paddles 22 and 24. Paddles 22 and 24 are here shown rectangular, but may be of any convenient shape and size. Arms 14 and 16 are mounted to table 10 so that paddle portions 22 and 24 each extend above the tabletop 26 at essentially right angles thereto along two adjacent sides. The ends of each arm opposite the paddle portions 22 and 24 are formed into legs 14b, 16b on which are respectively mounted cam followers 28, 30. Also, the extremities of [lets] *legs* 14b and 16b are interconnected by a spring 32.

Jogger arms 14 and 16 are preferably actuated by driving means suspended beneath the table, comprising a multilobed cam 34 which is in operative engagement with cam followers 28 and 30 as shown in FIGS. 2 and 3. Cam 34 is in turn driven through shaft 35 by a motor 36 (FIG. 4). Motor 36 may act through a gearbox or in some other known manner be speed controllable to adjust for various conditions and/or materials to be jogged. A fan 37 may be provided at the other end of shaft 35 to cool motor 36.

As generally discussed above, arms 14 and 16 and their associated paddles 22 and 24 are actuated to pivot in synchronism, achieving the particularly advantageous agitating motion provided by the invention. To achieve synchronism with a multilobed cam, careful consideration must be given to the positioning of cam followers 28 and 30 and the configuration of cam 34; specifically, the three members are so designed and mounted in the jogger that when one cam follower is riding on the peak of one cam lobe, the other follower is riding in a depression between lobes. This driving action between cam 34 and the cam followers 28 and 30 on jogger arms 14 and 16 can best be seen by reference to FIGS. 2 and 3.

In FIG. 2, the left arm 14 is in an extreme outward or counterclockwise position as a result of follower 28 being urged in a counterclockwise direction around pivot 20 by the peak of cam lobe 34a. At the same point in time, the right-hand arm 16 is also in its extreme counterclockwise position as a result of follower 30 riding in the depression between cam lobes 34b and 34c.

Referring now to FIG. 3, as cam 34 continues to turn in the direction indicated by the arrow, follower 28 on arm 14 progresses to the depression between lobes 34a and 34b while follower 30 on arm 16 progresses to the peak of lobe 34c. Spring 32, by biasing the two arms towards cam 34, insures that followers 28 and 30 will closely follow the configured surface thereof. Thus, arms 14 and 16 in the course of an approximately 30° rotation of cam 34 are substantially simultaneously pivoted from extreme counterclockwise positions to extreme clockwise positions. It can be seen that the above cycle will repeat as cam 34 continues its rotation.

A relatively rapid pivoting of arms 14 and 16 in the manner described above thus causes paddle portions 22 and 24 to rapidly tamp adjacent edges of every paper sheet deposited and stacked on tabletop 26 and thereby bring it into alignment. As seen from FIGS. 2 and 3, the stack is alternately tamped by the upper end portion of paddle 22 and the lower end portion of paddle 24 and then the lower end portion of paddle 22 and the upper end portion of paddle 24 during each cycle. The inward movement of the paddles stops just short of the table which remains stationary.

An important feature of the invention resides in the fact that the stack is prevented from falling down beyond the lower edges of the table due to the action of the paddles. However, some of the sheets in the stack which are misaligned therewith will come into contact with the paddles since the gravity component of the inclined table brings a corner of the stack to the corner of the table where the paddles are disposed. The opposite ends of the oscillating paddles then alternately tamp the misaligned sheets back into alignment with the stack. Thus, once all of the sheets have been aligned, agitation of the stack is largely avoided, thereby minimizing any chance of further misalignment of individual sheets or the buildup of static charges between sheets.

It will be appreciated that by using a cam, such as cam 34, with symmetrical lobes, the paddles move in synchronism at all times. As a consequence, they could be carried by a single arm rather than separate arms, as illustrated.

Figure 5:
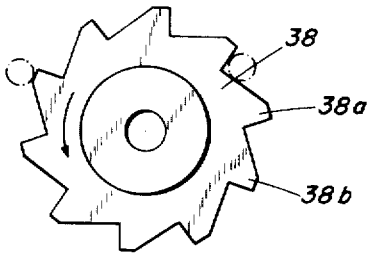
FIG. 5 is a plan view of a preferred, multilobed cam configuration for use in the jogger of the invention.

The number and configuration of the lobes on cam 34 may be varied according to requirements. One cam configuration which has been found to work particularly well for paper sheets is shown in FIG. 5. This cam 38 comprises 10 buttress-shaped lobes 38a, 38b, etc., machined or otherwise formed into the periphery of a circular cam blank at 36° intervals.

The cam followers 28 and 30 are positioned relative to cam 38 such that when one is riding the peak of a lobe, the other is in a depression between lobes, as in the case of cam 34. While the resulting movement of the paddle arms is essentially synchronous, there is an interval during each cycle of movement when the paddles are being pivoted in opposite directions. This is due to the nonsymmetrical configuration of the lobes of cam 38. However, the particular lobe shape of cam 38 produces a more abrupt tamping action of the paddles against the edges of misaligned sheets, thus facilitating stack alignment.

A cam such as 38 may be formed from any convenient material and plastic materials such as Delrin have proven quite satisfactory. Cam 38 has provided effective jogging action on paper stacks when driven at approximately 52 r.p.m.; at that speed, paddle portions 22 and 24 will pivot at approximately 520 cycles per minute. Other speeds however, may be found more appropriate for differently configured cams, or for stacked materials other than paper.

Referring back to FIG. 1, a paper prop 40 may be provided on tabletop 26 to facilitate the jogging of cross-stacked sheets. Prop 40 as shown in FIG. 4 may comprise a bent piece of spring wire secured to table 10 at one end by a nut 42 or the like and sloping downwardly towards paddles 22 and 24. The other end 43 of prop 40 may be freely engaged in an opening in tabletop 26. The angular configuration of prop 40 will add somewhat to the gravitational effect of the tilted tabletop 26. As can be seen, the illustrated preferred mounting of prop 40 provides it with a degree of resiliency to minimize chances of breakage. Prop 40, however, may comprise a solid sloped block mounted on tabletop 26 or some other equivalent structure.

Figure 7:
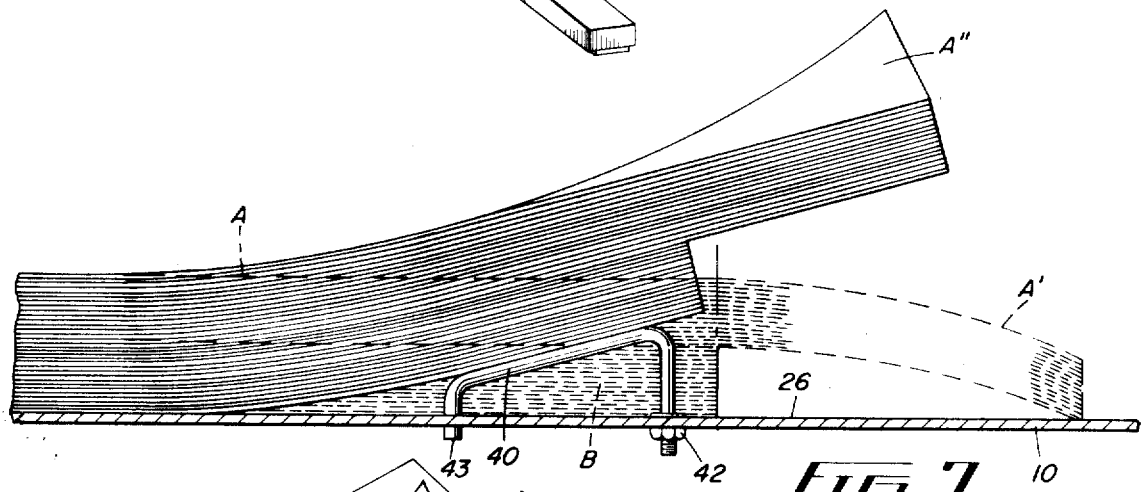
FIG. 7 is a greatly enlarged, partial side elevation view of cross-stacked sheets on a jogger taken along line 7—7 of FIG. 8 illustrating the prior art pinching problem (dotted lines) and the manner in which pinching is eliminated by the invention (solid lines).

The effect of prop 40 on cross-stacked sheets comprising upper stack A and lower stack B can be seen by reference to FIG. 7. As shown by dotted lines, without prop 40 the overhanging portion A′ of upper stack A tends to sag, causing a pinching effect on the corner of stack B below. This pinching effect will normally inhibit or prevent the alignment of sheets in lower stack B by retarding sheet movement. However, the use of a prop 40 in accordance with the invention causes the cross-stacked sheets to distort or curl upward in the area of overhang as shown in FIG. 8. By thus being distorted or curled, the paper sheets are stiffened thus eliminating sagging in the overhanging portion A″ and the resultant pinching effect as shown by solid lines in FIG. 7. Moreover, since the sheets are stiffened by the effect of the prop, the misaligned sheets become more responsive to the tamping of the paddles and are thus more readily aligned. Prop 40 thus facilitates the use of cross-stacking, permitting maximum utilization of each jogger for commercial applications.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A jogger for aligning stacked sheets of paper or the like comprising (A) an inclined table angled substantially toward one corner thereof, (B) a pair of elongate paddles disposed along and in spaced relationship with adjacent edges of said table proximate said one corner and extending above the upper surface of said table, (C) means mounting said paddles for pivotal movement with respect to said adjacent edges of said table such that opposite ends of said paddles [contact] *stop short of* said adjacent edges of said table at the end of said pivotal movement of said paddles, and (D) driving means causing relative, alternating clockwise and counterclockwise pivotal movement between said paddles and said table whereby misaligned sheets stacked on said table are agitated by contact with said paddles and brought into stacked alignment.

2. A jogger as defined in claim [7,] *1* including prop means mounted on said table for elevating the overhanging extremities of cross-stacked sheets in a manner to relieve pinching and facilitate the alignment thereof by said paddles.

3. A jogger as defined in claim 2 wherein said prop means comprises a bent spring wire secured to said tabletop at one end and sloping downwardly toward said paddles, the other end of said spring wire being freely engaged in an opening in said tabletop to provide a resilient mounting therefor.

4. A jogger as defined in claim 1 wherein said paddles are pivotally mounted at effective pivot points located at substantially their midlengths.

5. A jogger as defined in claim 1 wherein said paddles are supported by separate arms pivotally mounted to said table, said arms carrying cam followers, said driving means comprising a continuously rotating multilobed cam, the lobes of which are in operative engagement with said cam followers, whereby, upon rotation of said cam, said jogger arms are pivoted in synchronism to pivot said paddles.

6. The jogger defined in claim 5 wherein the positioning of said arms and the configuration of said cam are such that when one cam follower is riding a lobe peak, the other cam follower is riding in a depression between lobes.

7. A jogger as defined in claim 5 including a spring connecting said jogger arms and urging said cam followers to follow the contour of said cam.

8. A jogger as defined in claim 5 wherein the lobes of said cam are buttress shaped.

9. A jogger as defined in claim 8 wherein said cam carries 10 buttress-shaped lobes equally spaced around the periphery thereof.

10. A jogger as defined in claim 1 wherein said means mounting said paddles comprises an arm connected to each paddle at substantially the midlength thereof and including means pivotably connecting said arms to said table at substantially the intersection of said arms with said paddles.

References Cited

The following references, cited by the Examiner, are of record in the patented file of this patent or the original patent.

UNITED STATES PATENTS

| | | | |
|---|---|---|---|
| 1,387,602 | 8/1921 | La Veck | 271—89 |
| 1,434,907 | 11/1922 | Miller | 271—89 |
| 1,891,286 | 12/1932 | Miersch | 271—89 X |

FOREIGN PATENTS

| | | | |
|---|---|---|---|
| 14,447 | 7/1905 | Great Britain | 271—89 |

EVON C. BLUNK, Primary Examiner

B. H. STONER, Jr., Assistant Examiner